Oct. 25, 1966 J. P. CURRY 3,281,019
MATERIAL DISPENSER FOR PACKING A COLUMN OF NARROW TUBING
Filed Oct. 22, 1963
2 Sheets-Sheet 2
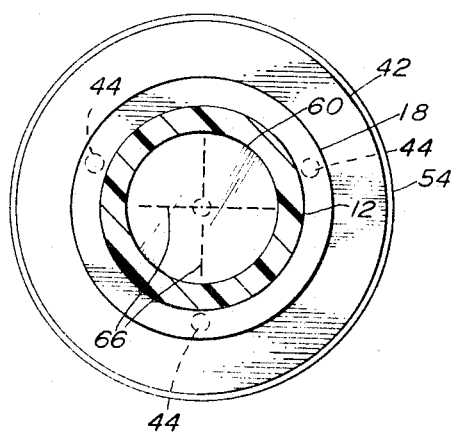
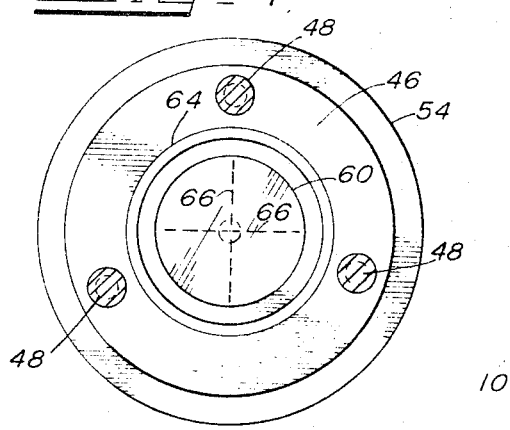
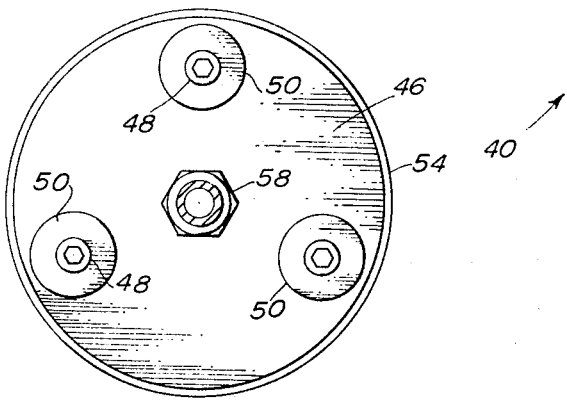
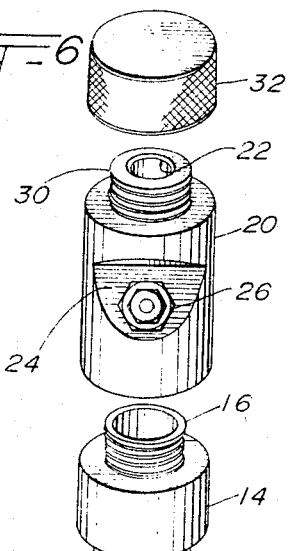
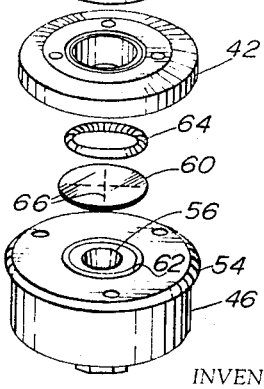
INVENTOR.
JOHN P. CURRY

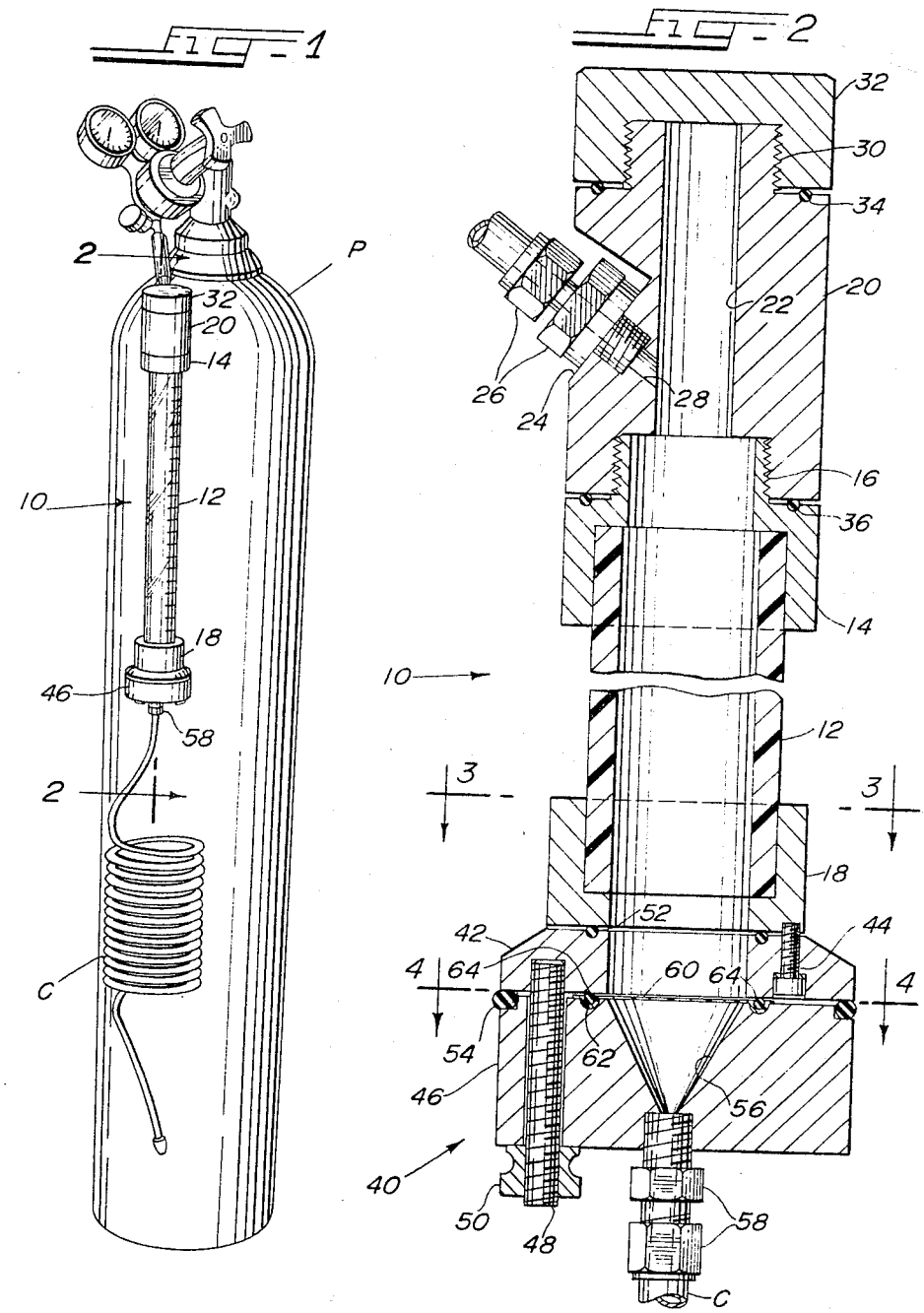

United States Patent Office 3,281,019
Patented Oct. 25, 1966

3,281,019
MATERIAL DISPENSER FOR PACKING A COLUMN OF NARROW TUBING
John P. Curry, 874 3rd Ave., Des Plaines, Ill.
Filed Oct. 22, 1963, Ser. No. 317,932
10 Claims. (Cl. 222—158)

This invention relates generally to gas chromatography and more particularly to a device for packing the columns which invariably are employed in such procedures.

Although gas chromatography is of relatively recent origin, it has quickly developed into one of the most important tools in the field of analytical chemistry. In general, gas chromatography is a method of analysis by means of which individual components in a sample are separated from a great variety of compounds. The techniques may be employed for both quantitive and qualitative analysis of such compounds.

Stated very briefly, gas chromatography is a physical separation method whose function depends upon the condition that the components to be separated are distributed between two different phases. One of these phases comprises a stationary bed of great surface area, while the other phase comprises a fluid which is caused to seep or percolate through the stationary bed. In the most important type of chromatography, known as gas-liquid chromatography (GLC), the stationary phase comprises a selected liquid which is impregnated in a solid support of finely divided material such as diatomaceous earth. The fluid phase generally comprises a carrier gas which is preferably inert, such as helium.

In practice, a small sample of the mixture to be analyzed is vaporized into a column containing the stationary bed. The mixture is absorbed by the selected liquid at or near the head of the column. The carrier gas is forced through the column which causes a desorption of the previously absorbed mixture. A continuing adsorption-desorption process occurs as the sample is moved through the length of the column by the carrier gas. However, because of the differing physical affinity, or retention characteristics, between the stationary liquid and the various components of the sample, each component travels through the column at its own rate of speed. As a result, the carrier gas emerges from the discharge end of the column bearing with it only one component at a time, thereby permitting the detection of each component and the compilation of the desired analytical data.

From the foregoing brief description, it will be apparent that the very heart of the chromatographic system is the column. Generally, these columns comprise substantial lengths of coiled copper, glass or other tubing so that the greatest length of column is provided in the smallest volume of occupied space. Those versed in the art will immediately recognize the difficulties encountered in packing such a column with the liquid impregnated diatomaceous material. Until quite recently, this packing was laboriously done by hand with frequent vibrating and tamping in an effort to insure consistent and void free packing of the column. More recently, there have been provided devices into which a measured amount of the material could be poured, and then, after connecting the device to the column the material could be pneumatically and quickly forced into the column. However, even these devices were not completely satisfactory because of various disadvantageous features. Thus, for example, when the material-filled device was connected to the column, undesirable premature leakage of the material occurred before the pneumatic pressure was applied. Similarly, even after the pneumatic pressure was applied, the entire mass of the material was not discharged under identical pressure. As a result of these conditions, there frequently resulted voids or inconsistent packing in the column. Since the efficiency of the chromatographic technique is directly related to the physical condition of the column, it is highly desirable that the column be packed without voids or inconsistencies of density. Moreover, it is essential that some method or means for consistently achieving such packing be provided.

It is therefore an important object of this invention to provide a device for packing gas chromatographic columns which overcomes all of the disadvantages mentioned hereinabove.

Another important object of the invention is to afford a device of the character described which positively prevents the premature leakage of any diatomaceous material into the column prior to being pneumatically forced thereinto.

A further object is to provide a device of the character described which insures that all of the material contained therein will be packed into the column under substantially constant pneumatic pressure.

In accordance with the stated objects, the invention comprises a device of the character described which includes a frangible diaphragm that support the diatomaceous material and prevents all premature leakage thereof. When pneumatic pressure is applied to the device, the diaphragm retains its integrity until a pre-determined pressure is achieved. At this point, the diaphragm bursts and all of the material is now forced into the column under substantially constant pressure.

Still another object of the invention is to afford a device of the character described having improved design characteristics for facilitating and expediting the flow of all of the material into the column.

Yet another object is to provide a device of the character described which may be readily disassembled and in which the spent or burst diaphragm may be readily replaced.

Still a further object is to afford a device of the character described which is most accurate, efficient and durable for the purposes intended and yet is substantially foolproof and simple to use.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts through the several figures of the drawings:

FIG. 1 is a perspective view of a device for packing gas chromatographic columns embodying the principles of the invention, and showing the same operationally connected to a chromatographic column and a source of pneumatic pressure;

FIG. 2 is an enlarged fragmentary sectional view taken substantially on the plane of line 2—2 in FIG. 1 and viewed in the direction indicated;

FIG. 3 is a sectional view taken on the plane of line 3—3 in FIG. 2 and viewed in the direction indicated;

FIG. 4 is a sectional view taken on the plane of 4—4 in FIG. 2 and viewed in the direction indicated;

FIG. 5 is a bottom plan view of the device; and

FIG. 6 is an exploded perspective view showing the relationship of the various disassembled parts.

Referring more particularly to the various figures of the drawings, it will be seen that the reference numeral 10 indicates generally a device for packing gas chromatographic columns embodying the principles of the invention. In FIG. 1, the device 10 is shown operationally connected to a source of pneumatic pressure such as the pressurized gas cylinder P. At its opposite or discharge end, the device 10 is shown operationally connected to a typical coiled chromatographic column C.

The device 10 comprises a central cylindrical reservoir 12 which is preferably made of transparent but extremely strong cast acrylic. The reservoir may be marked with graduated volumetric calibrations as indicated in FIGS. 1 and 6 so that the exact amount of material being placed therein may always be accurately determined. Secured to the top end of the reservoir 12 is an annular, centrally-bored collar 14 which is provided with a reduced-diameter externally threaded top portion 16. Similarly secured to the bottom end of the reservoir 12 is an annular, centrally-bored collar 18.

Threadedly connected to the top collar portion 16 is a cylindrical head section 20 which is provided with a longitudinal central bore 22. The outer surface of the head section 20 may be formed with a recessed inclined face 24 upon which may be mounted in angular protruding position, suitable fittings such as 26 for connection to the gas cylinder P. The head section 20 is likewise provided with a passageway 28 communicating with the bore 22, and a reduced diameter externally threaded upper portion 30.

A cap 32 is threaded connected to the head section portion 30, and it will thus be appreciated that the liquid-impregnated material may be readily poured into the reservoir 12 through the bore 22 simply by removing the cap. It should likewise be noted that the arrangement of the inclined face 24 and fittings 26 conveniently permits the device to remain connected to the gas cylinder P during the filling operation. As indicated in FIG. 2, elastomeric O-rings such as 34 and 36 may likewise be employed to further insure airtight integrity of the device.

A material flow sub-assembly indicated generally by the reference numeral 40 is connected to the bottom collar 18. The sub-assembly 40 comprises an annular, centrally-bored, disc-like adaptor member 42 which may be connected to the collar 18 by means of a plurality of screws such as 44. Connected to the member 42 is a cylindrical flow member 46. The members 42 and 46 may be releasably connected together by a plurality of elongated bolts such as 48 and lock nuts such as 50. Flexible O-rings such as 52 and 54 may likewise be employed to further insure airtight integrity of the device.

The flow member 46 is formed with a central flow passage 56 which communicates with the reservoir 12, and it is important to note that said flow passage tapers downwardly in the form of an inverted cone. It has been discovered that this particular configuration of flow passage is most efficient and insures free and complete flow of the material out of the device 19 with substantially no material clinging or remaining therein. Suitable fittings such as 58 communicate with the lower end of the flow passage 56 for connection of the device to the column C.

Securely but removably positioned across the mouth of the flow passage 56 is a membrane or diaphragm 60. The diaphragm 60 comprises a relatively thin sheet which may be made of any suitable material such as polyethylene, "cellophane," or the like. For purposes of operationally retaining the diaphragm 60, the top surface of the member 46 is formed with an annular groove 62 and a flexible O-ring 64 is employed to firmly retain the marginal edges of the diaphragm within said groove. It will thus be appreciated that the diaphragm 60 supports any material in the reservoir 12 and does not permit any premature leakage thereof out through the flow passage 56.

Turning to FIGS. 3, 4 and 6, it is important to note that the diaphragm 60 is formed with a pair of intersecting score or perforation lines such as 66, 66. While the perforation lines 66 are not sufficiently deep to impede the weight supporting function of the diaphragm, they nonetheless provide a weakened area in the diaphragm which will tear or bust along said lines under sufficient pressure. Accordingly, when the gas pressure within the device reaches a predetermined level, the diaphragm tears at the lines 66 to provide for triangular fragments which are immediately forced downwardly into the flow passage 56. The material in the reservoir 12 now empties completely under the force of a substantially constant pressure into the column C to pack the same. To replace the spent diaphragm, it is simply necessary to remove the O-ring 64 and insert a fresh diaphragm thereunder.

Although the sub-assembly 40 has been shown and described as including the adaptor member 42, it should of course be appreciated that this member may be eliminated entirely if desired. In that event, the flow member 46 would of course be removably connected directly to the collar 18.

From the foregoing description and drawings, it should be apparent that I have provided a novel device for packing gas chromatographic columns more efficiently than heretofore possible. The frangible diaphragm 60 prevents all premature leakage of material from the reservoir and likewise insures that all material is ejected from the device under substantially uniform pneumatic pressure. Moreover, the cone-shaped flow passage 56 insures free and complete ejection of all material while the configuration and arrangement of the head section and cap permit repeated use of the device without necessitating the disconnection thereof from the gas pressure source.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A device for packing gas chromatographic columns comprising an elongated cylindrical material reservoir having graduated volumetric indicia thereon, a top collar and a bottom collar connected to the top and bottom respectively of said reservoir, a centrally bored cylindrical head member removably connected to said top collar, a cap removably connected to said head member, said head member being formed with a recessed angular face in a side wall thereof, means attached to said angular face for connection to a source of pneumatic pressure, said means communicating with said central bore, an annular disc-like convertor removably connected to said bottom collar, a cylindrical flow member removably connected to said bottom collar, a cylindrical flow member removably connected to said converter member, said flow member being formed with a central inverted cone-shaped discharge passage, said member being formed with an annular groove in the top surface thereof and circumscribing the mouth of said discharge passage, an elastic O-ring removably positioned in said groove, and a flexible membrane positioned across the mouth of said discharge passage, said O-ring operationally retaining the marginal edges of said membrane in said groove, said membrane being formed with a pair of centrally intersecting score lines adapted to tear when the pneumatic pressure in said device reaches a pre-determined level.

2. A device for packing gas chromatographic columns comprising an elongated cylindrical material reservoir having graduated volumetric indicia thereon, a top collar and a bottom collar connected to the top and bottom respectively of said reservoir, a centrally bored cylindrical head member removably connected to said top collar, a cap removably connected to said head member, a recessed angular face on the side wall of said head member, means mounted on said angular face for connection to a source of pneumatic pressure, said means communicating with said central bore, a cylindrical flow member removably connected to said bottom collar, said flow member being formed with a central inverted cone-shaped discharge passage, and means attached to said flow member in communication with said flow passage for connection to a chromatographic column.

3. A material dispenser comprising:
  a column of narrow hollow tubing with a portion thereof being coiled;
  a material reservoir having an inlet end and a discharge end with an outlet;
  means for connecting said tubing to said discharge end to permit the outlet of said discharge end to communicate with said tubing;
  means for admitting pneumatic pressure into said reservoir; and
  a flexible frangible diaphragm positioned across said discharge end to prevent leakage of material into said tubing from said outlet until the pressure in said reservoir reaches a pre-determined level, said diaphragm being formed with at least one area of reduced tensile strength adapted to be ruptured when the pneumatic pressure in said reservoir reaches said pre-determined level, said ruptured diaphragm offering substantially no resistance to the flow of material from said reservoir to said tubing, thereby permitting said material dispenser to maintain an even flow of material to prevent the occurrence of voids in said tubing.

4. The device of claim 3 in which said diaphragm comprises a membraneous sheet and said area of reduced tensile strength comprises a score line formed in said sheet.

5. A material dispenser comprising:
  a column of narrow hollow tubing with a portion thereof being coiled;
  a material reservoir having an inlet end and a discharge end with an outlet;
  pressure means associated with said inlet end to force material through said discharge end;
  a flow member connected to said discharge end and having an inverted cone-shaped flow passage with a base end of substantially greater cross-sectional area than the apex end thereof, said flow member being connected to said discharge and to permit communication between the base end and the outlet of said discharge end; and
  means for connecting said column to the flow member whereby the apex of the cone passage communicates with the hollow tubing so that material is discharged into the coil.

6. A material dispenser, as defined in claim 5, wherein a frangible diaphragm is securely disposed between said discharge end and the base of said cone passage, said frangible diaphragm preventing the discharge of said material until acted upon by a pre-determined pressure.

7. A material dispenser, as defined in claim 6, wherein said frangible diaphragm is formed with at least one area of reduced tensile strength, said one area being adapted to be ruptured by said pre-determined pressure.

8. A material dispenser, as defined in claim 7, wherein said one area of reduced tensile strength comprises a score line formed in said frangible diaphragm, said score line rupturing upon the application of said pre-determined pressure thereto.

9. A material dispenser, as defined in claim 8, wherein said flow member includes an annular groove in the top surface thereof and circumscribing the base of said cone passage, and a ring member retains the marginal edges of said frangible diaphragm in said groove, thereby maintaining said frangible diaphragm securely across said base to prevent leakage of said material.

10. A material dispenser for packing gas chromatographic columns comprising:
  an elongated cylindrical material reservoir;
  a top collar and a bottom collar connected to the top and bottom respectivelly of said reservoir;
  a head member removably connected to said top collar;
  a cap removably connected to said head member;
  means mounted on said head member for connection to a source of pneumatic pressure;
  a cylindrical flow member removably connected to said bottom collar, said flow member being formed with a centrally disposed inverted cone-shaped discharge passage; and
  means attached to said flow member in communication with said discharge passage for connection to a chromatographic column.

References Cited by the Examiner
UNITED STATES PATENTS

| | | | |
|---|---|---|---|
| 2,720,881 | 10/1955 | Jones | 222—490 X |
| 2,755,003 | 7/1956 | Sherbondy | 222—387 X |
| 2,937,795 | 5/1960 | Cilibert | 222—490 |
| 3,136,456 | 6/1964 | Sherbondy | 222—389 X |
| 3,150,801 | 9/1964 | Hamilton | 222—386 X |

ROBERT B. REEVES, *Primary Examiner.*

RAPHAEL M. LUPO, LOUIS J. DEMBO, *Examiners.*

N. L. STACK, *Assistant Examiner.*